United States Patent [19]

Meyer

[11] Patent Number: 5,203,174

[45] Date of Patent: Apr. 20, 1993

[54] REFLEXIVE FUEL HEATING SYSTEM

[75] Inventor: Robert H. Meyer, West Bloomfield, Mich.

[73] Assignee: Williams International Corporation, Walled Lake, Mich.

[21] Appl. No.: 726,371

[22] Filed: Jul. 5, 1991

[51] Int. Cl.$^5$ .............................................. F02C 7/224
[52] U.S. Cl. .................................... 60/736; 60/734
[58] Field of Search ........................ 60/734, 736, 267; 417/366

[56] References Cited

U.S. PATENT DOCUMENTS

| 3,080,716 | 3/1963 | Cummings et al. | 60/736 |
| 4,646,774 | 3/1987 | Hansen | 60/736 |
| 4,696,156 | 9/1987 | Burn et al. | 60/736 |

Primary Examiner—Louis J. Casaregola
Attorney, Agent, or Firm—Lyon & Delevie

[57] ABSTRACT

A reflexive fuel heating system for fuel entering the fuel filter of an engine comprises a heat exchanger disposed between a fuel tank and the fuel filter for transferring heat generated in a gear type fuel pump to the fuel.

2 Claims, 1 Drawing Sheet

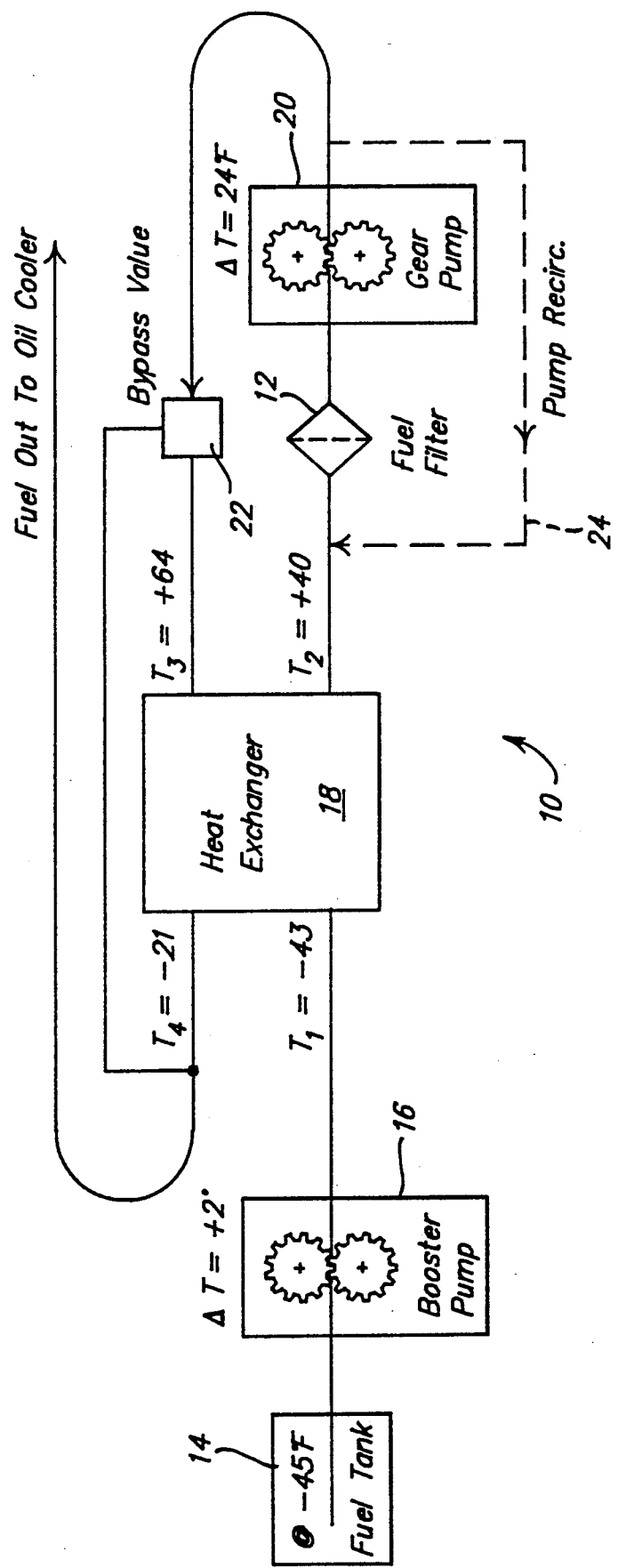

REFLEXIVE FUEL HEATING SYSTEM

BACKGROUND OF THE INVENTION

It is generally necessary to heat the fuel for a jet aircraft engine from, for example, −45° F. at the tank to +40° F. upstream of the fuel filter to preclude icing of the fuel filter. Present fuel heating systems often use heat rejected from the engine lube oil to accomplish this temperature rise. Yet another expedient is to extract heat from the engine exhaust. However, such systems have proved to be inadequate since they work well only at full power. Substantially less heat is available for heating the fuel at idle in cold day conditions.

SUMMARY OF THE INVENTION

The present invention relates to a reflexive fuel heating system that extracts heat from the fuel that has been added thereto by the engine fuel pump. The heat is added to the fuel upstream of the fuel filter by way of a heat exchanger. The disclosed reflexive fuel heating system presents a relatively dependable and straightforward means of precluding freezing of fuel in the fuel filter. With a 24° F. temperature rise at the fuel pump, 77% effectiveness is achieved at take-off conditions. Part power performance exceeds full power performance as both pump temperature rise and heat exchanger efficiency increase in the "off design" condition. A thermostatically controlled bypass valve is placed in the fuel line, shunting the hot side of the heat exchanger during high ambient temperature conditions thereby to regulate temperature of the fuel entering the hot side of the heat exchanger to 140° F. After warmup, transient response of the system excludes thermal spikes, as identical flows pass both sides of the heater.

BRIEF DESCRIPTION OF THE DRAWINGS

The drawing is a schematic representation of the reflexive fuel heating system of the invention.

DETAILED DESCRIPTION OF THE PREFERRED EMBODIMENT OF THE INVENTION

As seen in the drawing, a reflexive fuel heating system 10, in accordance with a preferred constructed embodiment of the present invention, is designed to raise the temperature of fuel entering a fuel filter 12 from, for example, −45° F. in a fuel tank 14 to +40° F. at the filter inlet.

In operation, fuel from the tank 14 is pressurized by a booster pump 16 which, because of its inherent design characteristics adds only 2° F. of heat to the fuel. Fuel from the booster pump 16 enters a cold side inlet of a heat exchanger 18 at a temperature of, for example, −43° F. The temperature of the fuel flowing to the fuel filter 12 is raised in the heat exchanger 18 from −43° F. to +40° F. at which temperature the fuel enters the fuel filter 12.

Fuel from the filter 12 passes through a conventional gear type fuel pump 20 which, because of its inherent characteristics, raises the temperature of the fuel 24° F. to 64° F.

Fuel at 64° F. enters the hot side of the heat exchanger 18 wherein heat is rejected lowering its temperature to −21° F.

The aforesaid temperature relationship in the heat exchanger 18 can be expressed by the equation:

$$E = \frac{T_1 - T_2}{T_1 - T_3} = \frac{T_4 - T_3}{T_1 - T_3} = .775$$

where
E = heat exchanger effectiveness
$T_1$ = Heat exchanger temperature at the cold side inlet
$T_2$ = Heat exchanger temperature at the cold side outlet
$T_3$ = Heat exchanger temperature at the hot side inlet
$T_4$ = Heat exchanger temperature at the hot side outlet In high ambient temperature conditions, a thermostatically controlled bypass valve 22 is utilized to shunt fuel around the heat exchanger 18, to ensure that heat added to fuel in the heat exchanger 18 does not raise the temperature thereof above 80° F.

In addition to the aforesaid heat exchange system, a conventional pump recirculation path is provided from the output side of the fuel pump 20 to the upstream side of the fuel filter 18 for pressure control purposes.

While the preferred embodiment of the invention has been disclosed, it should be appreciated that the invention is susceptible of modification without departing from the scope of the following claims.

I claim:
1. A reflexive fuel heating system for an engine comprising
   a fuel tank,
   a heat exchanger having a cold side inlet for liquid fuel, a cold side outlet for liquid fuel, a hot side inlet for liquid fuel and a hot side outlet for liquid fuel, the cold side liquid fuel inlet being in liquid fuel flow communication with said fuel tank,
   a fuel filter having an inlet in liquid fuel flow communication with the cold side outlet of said heat exchanger and an outlet for liquid fuel,
   a gear type fuel pump having an inlet in liquid fuel flow communication with said outlet of said fuel filter and a single outlet in liquid fuel flow communication with the hot side inlet of said heat exchanger, and
   means connecting the hot side outlet of said heat exchanger for conducting the entire output of liquid fuel from said pump to said engine whereby heat generated in liquid fuel passing through said fuel pump is transferred in said heat exchanger to fuel upstream of said fuel filter.
2. A fuel heating system in accordance with claim 1 including a thermostatically controlled valve for shunting fuel around said heat exchanger at a predetermined temperature.

* * * * *